126,591

UNITED STATES PATENT OFFICE.

PHILIPP TRAUTWEIN, OF BROOKLYN, NEW YORK.

IMPROVEMENT IN HAIR-RESTORATIVES.

Specification forming part of Letters Patent No. 126,591, dated May 7, 1872.

*To all whom it may concern:*

Be it known that I, PHILIPP TRAUTWEIN, of Brooklyn, in the county of Kings and State of New York, have invented a new and Improved Hair-Restorative; and I do hereby declare the following to be a full, clear, and exact description thereof, which will enable those skilled in the art to make and use the same.

This invention consists in a compound made of a decoction of gall-nuts mixed with a solution of sugar-of-lead.

The proportion in which I mix the ingredients of my compound together is about as follows: Gall-nuts, six parts; sugar-of-lead, one part. I place the gall-nut in a pot or boiler, and add to them a quantity of water sufficient to cover them, (about one quart of water to a pound of gall-nut,) and then I boil them for a sufficient length of time to extract their strength. The sugar-of-lead I dissolve in a quantity of water using about one quart of water to two ounces of sugar-of-lead, and the solution thus produced I pour into the extract of gall-nuts while the latter is still hot. The mixture is then left standing until it is cold, and then it is strained and filled in bottles ready for use.

When the solution of sugar-of-lead comes in contact with the extract of gall-nuts, a creamy substance is formed, which, when applied to the head by rubbing it on with the hand, strengthens the nerves, and materially increases the growth of the hair; and it also prevents the hair from turning gray.

My restorative is of advantage in all cases of baldness of the head, but particularly in such cases where baldness sets in on account of a disease, such as nervous headaches, fever and ague, or other diseases of a similar nature.

What I claim as new, and desire to secure by Letters Patent, is—

A hair-restorative, made as herein described.

DR. PHILIPP TRAUTWEIN.

Witnesses:
W. HAUFF,
E. F. KASTENHUBER.